United States Patent
Ozawa et al.

(10) Patent No.: US 8,542,308 B2
(45) Date of Patent: Sep. 24, 2013

(54) DIGITAL PHOTOGRAPHING APPARATUS WITH LENS UNIT CONFIGURED FOR FLEXIBLE PRINTED CIRCUIT BOARDS HAVING DIFFERENT LENGTHS

(75) Inventors: Hidemasa Ozawa, Suwon-si (KR); Young-ho Yu, Suwon-si (KR); Ju-myoung Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 12/503,975

(22) Filed: Jul. 16, 2009

(65) Prior Publication Data

US 2010/0013980 A1    Jan. 21, 2010

(30) Foreign Application Priority Data

Jul. 17, 2008   (KR) .................. 10-2008-0069751

(51) Int. Cl.
   *H04N 5/225*   (2006.01)
(52) U.S. Cl.
   USPC ............ 348/340; 348/374; 396/535; 396/542
(58) Field of Classification Search
   USPC ................ 348/340, 374; 396/52–55, 542, 396/535
   See application file for complete search history.

(56) References Cited

U.S. PATENT DOCUMENTS

| | | | |
|---|---|---|---|
| 4,864,348 A * | 9/1989 | Fujiwara et al. | 396/542 |
| 5,051,764 A | 9/1991 | Nomura | |
| 5,537,177 A * | 7/1996 | Terunuma | 396/281 |
| 5,655,171 A | 8/1997 | Machida et al. | |
| 5,717,969 A | 2/1998 | Miyamoto et al. | |
| 2002/0025148 A1* | 2/2002 | Sato | 396/72 |
| 2003/0016300 A1* | 1/2003 | Ting | 348/335 |
| 2003/0067544 A1* | 4/2003 | Wada | 348/208.7 |
| 2005/0265716 A1* | 12/2005 | Tsuji | 396/542 |
| 2006/0115260 A1* | 6/2006 | Nomura | 396/268 |
| 2006/0159438 A1 | 7/2006 | Kobayashi | |
| 2006/0285840 A1* | 12/2006 | Takahashi | 396/55 |
| 2007/0002160 A1* | 1/2007 | Goto | 348/340 |
| 2008/0094488 A1* | 4/2008 | Oishi et al. | 348/240.99 |
| 2009/0027507 A1* | 1/2009 | Kobayashi et al. | 348/208.11 |
| 2009/0040369 A1 | 2/2009 | Miyoshi | |
| 2010/0134678 A1* | 6/2010 | Xu | 348/340 |

\* cited by examiner

*Primary Examiner* — Sinh Tran
*Assistant Examiner* — Paul Berardesca
(74) *Attorney, Agent, or Firm* — Drinker Biddle & Reath LLP

(57) ABSTRACT

Provided is a digital photographing apparatus that includes a lens unit frame having an opening through which light enters from a forward direction, and having a lens unit to be disposed inside the frame, or having a lens barrel comprising a lens unit to be disposed inside the frame; and a lens unit base disposed at a rear of the frame so as to be coupled to the frame, wherein the frame comprises a first opening through which a printed circuit board (PCB) emerges from the inside of the frame to the outside of the frame, and wherein the frame and the lens unit base are disposed to form a gap therebetween, thereby forming a second opening corresponding to the gap through which a PCB emerges from the inside of the frame to the outside of the frame.

18 Claims, 9 Drawing Sheets

DIGITAL PHOTOGRAPHING APPARATUS WITH LENS UNIT CONFIGURED FOR FLEXIBLE PRINTED CIRCUIT BOARDS HAVING DIFFERENT LENGTHS

CROSS-REFERENCE TO RELATED PATENT APPLICATION

This application claims the benefit of Korean Patent Application No. 10-2008-0069751, filed on Jul. 17, 2008, in the Korean Intellectual Property Office, the disclosure of which is incorporated herein in its entirety by reference.

BACKGROUND

The present invention relates to a digital photographing apparatus, and more particularly, to a low-priced digital photographing apparatus that can be mass manufactured by integrating components and lessening required materials during mass manufacturing.

In general, a digital photographing apparatus generates image data in an imaging device from incident light passing through a lens unit, and stores such image data. In order to control an incident time of light, the digital photographing apparatus includes a shutter unit. A printed circuit board (PCB) extends from the shutter unit so as to be coupled to a main PCB of the digital photographing apparatus, so that an operation of the shutter unit is controlled by a central processing unit (CPU) of the digital photographing apparatus.

Recently, various functions such as an optical hand-shaking compensation function, have been added to the digital photographing apparatus, and components having such various functions may be arranged in the lens unit. In this regard, such components may be integrated in the shutter unit. In this case, the PCB extending from the integrated shutter unit includes not only wiring and/or a chip of the shutter unit but also includes wiring and/or chips of the components integrated in the shutter unit, so that the length of the PCB has to be increased. Accordingly, with respect to a shape of a lens unit frame enclosing the shutter unit, a shape of a lens unit frame in a conventional digital photographing apparatus in which components are not integrated in a shutter unit, is different from a shape of a lens unit frame in a digital photographing apparatus in which the components are integrated in a shutter unit. Accordingly, there is a problem in that a lens unit frame having two different shapes has to be mass manufactured.

SUMMARY

Various embodiments of the present invention provide a low-priced digital photographing apparatus that can be mass manufactured by integrating components and lessening required materials during mass manufacturing.

According to an aspect of the present invention, there is provided a digital photographing apparatus including a lens unit frame having an opening through which light enters from a forward direction, and having a lens unit to be disposed inside the lens unit frame, or having a lens barrel comprising a lens unit to be disposed inside the lens unit frame; and a lens unit base disposed at a rear of the lens unit frame so as to be coupled to the lens unit frame, wherein the lens unit frame comprises a first opening through which a PCB (printed circuit board) emerges from the inside of the lens unit frame to the outside of the lens unit frame, and wherein the lens unit frame and the lens unit base are disposed to form a gap between the lens unit frame and the lens unit base, thereby forming a second opening corresponding to the gap through which a PCB emerges from the inside of the lens unit frame to the outside of the lens unit frame.

According to another aspect of the present invention, there is provided a digital photographing apparatus including a lens unit frame having an opening through which light enters from a forward direction, and having a lens unit to be disposed inside the lens unit frame, or having a lens barrel comprising a lens unit to be disposed inside the lens unit frame, wherein the lens unit frame comprises a first opening through which a PCB emerges from the inside of the lens unit frame to the outside of the lens unit frame, and a second opening through which a PCB emerges from the inside of the lens unit frame to the outside of the lens unit frame.

The first opening and the second opening may be formed to be parallel to each other.

Longitudinal axes of the first opening and the second opening may be formed to be perpendicular to an axis of light incident on the lens unit frame.

The first opening may be disposed in a more forward direction than the second opening.

The digital photographing apparatus may further include a PCB emerging from the inside of the lens unit frame to the outside of the lens unit frame through the first opening, wherein the PCB is bent at least twice.

The PCB may extend from a shutter unit that is disposed inside the lens unit frame, toward a rear of the lens unit frame so as to emerge from the inside of the lens unit frame to the outside of the lens unit frame through the first opening so that within the frame, the PCB is bent at least twice.

The digital photographing apparatus may further include a PCB emerging from the inside of the lens unit frame to the outside of the lens unit frame through the second opening, wherein the PCB is bent at least three times.

The PCB may extend from a shutter unit that is disposed inside the lens unit frame, toward a rear of the lens unit frame so as to emerge from the inside of the lens unit frame to the outside of the lens unit frame through the second opening so that within the frame, the PCB is bent at least three times.

The shutter unit may include a hand-shaking compensation module.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings, in which exemplary embodiments of the invention are shown.

Figure 1A:
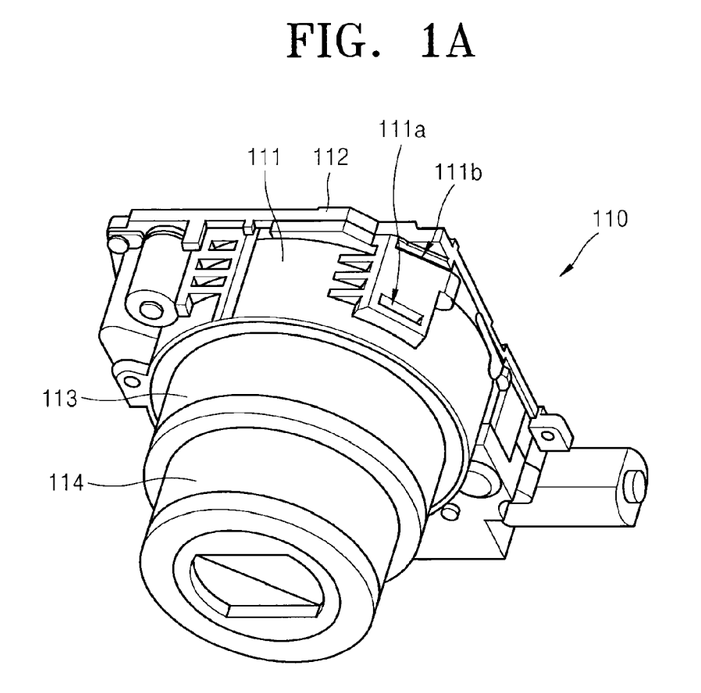
FIG. 1A is a perspective view of a portion of a digital photographing apparatus according to an embodiment of the present invention.
Figure 1B:
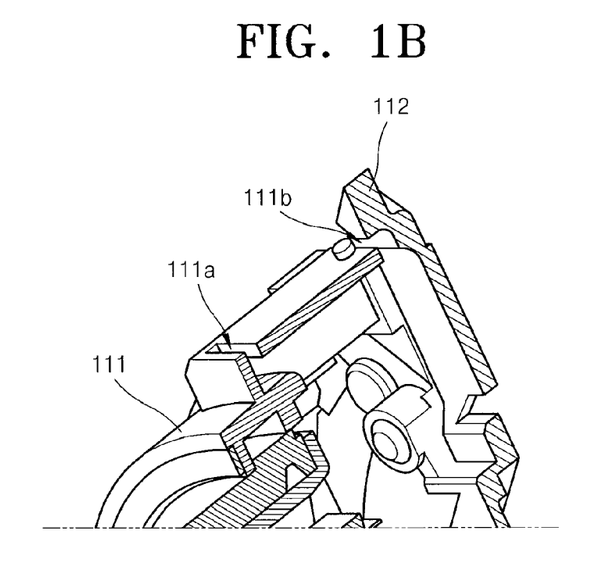
FIG. 1B is a cross-sectional perspective view of a portion of a lens unit frame assembly of FIG. 1A.

FIG. 1A is a perspective view of a portion of a digital photographing apparatus according to an embodiment of the present invention. In particular, FIG. 1A illustrates a lens unit frame assembly 110 in which first and second lens barrels 113 and 114, and a lens unit frame 111 are connected. FIG. 1B is a cross-sectional perspective view of a portion of the lens unit frame assembly 110 of FIG. 1A.

As illustrated in FIGS. 1A and 1B, the digital photographing apparatus according to the current embodiment includes the lens unit frame 111, and a lens unit base 112 disposed at a rear of the lens unit frame 111 so as to be coupled to the lens unit frame 111. The lens unit frame 111 has an opening through which light enters from a forward direction, and has a lens unit to be disposed inside the lens unit frame 111, or has a lens barrel including a lens unit to be disposed inside the lens unit frame 111. Referring to FIG. 1A, the first and second lens barrels 113 and 114 may be disposed inside the lens unit frame 111. To be more specific, FIG. 1A corresponds to a case in which the first and second lens barrels 113 and 114, which are disposed inside the lens unit frame 111, protrude in a forward direction with respect to the lens unit frame 111.

In the digital photographing apparatus according to the current embodiment, the lens unit frame 111 has a first opening 111a through which a printed circuit board (PCB) may emerge from the inside of the lens unit frame 111 to the outside of the lens unit frame 111. Also, the lens unit frame 111 and the lens unit base 112 are disposed to form a gap therebetween, thereby forming a second opening 111b corresponding to the gap through which a PCB may emerge from the inside of the lens unit frame 111 to the outside of the lens unit frame 111.

Various components as well as a lens barrel including a lens unit, or a lens unit and a shutter unit may be disposed inside the lens unit frame 111. The PCB extending from such a shutter unit emerges out of the lens unit frame 111 so as to be coupled to a main PCB of the digital photographing apparatus, such that an operation of the shutter unit may be controlled by a central processing unit (CPU) of the digital photographing apparatus. At this time, in the case where another component is integrated in the shutter unit, not only wiring and/or a chip of the shutter unit but also wiring and/or a chip of the other component integrated in the shutter unit are disposed on the PCB extending from the shutter unit, so that a length of the PCB having the integrated other component is longer than a length of a PCB with which another component is not integrated.

Thus, in a lens unit frame of a conventional digital photographing apparatus, an opening is formed to enable a PCB to emerge from the inside of the lens unit frame to the outside of the lens unit frame. At this time, the opening is formed at positions in the lens unit, which are different from each other and respectively correspond to a case in which a component is not integrated in a shutter unit and to another case in which a component is integrated in a shutter unit. Thus, the lens unit frames have different shapes from each other so as to be respectively used for the case and the other case. This is because the positions of the opening in the lens unit frame have to be different from each other according to a length of the PCB. Accordingly, during mass manufacturing of the conventional digital photographing apparatus, it is required to manufacture a plurality of shapes of lens unit frames to be respectively applied to different models, and thus manufacturing costs increase.

However, since the digital photographing apparatus according to the current embodiment includes the lens unit frame assembly 110 having the first opening 111a and the second opening 111b, although a length of the PCB is different with respect to a case in which a component is not integrated in a shutter unit and with respect to another case in which a component is integrated in a shutter unit, the lens unit frame assembly 110 having a constant same shape may be used. Since the lens unit frame assembly 110 has the first opening 111a and the second opening 111b, it is possible to use an appropriate one of the first and second openings 111a and 111b according to the situation. Thus, manufacturing costs for mass manufacturing may be substantially reduced.

In order to improve situational usefulness of the first and second openings 111a and 111b, the first opening 111a and the second opening 111b may be formed to be parallel to each other, as illustrated in FIGS. 1A and 1B. Also, the first opening 111a may be disposed in a more forward direction than the second opening 111b, so that they may be appropriately selected according to the situation.

Figure 2A:
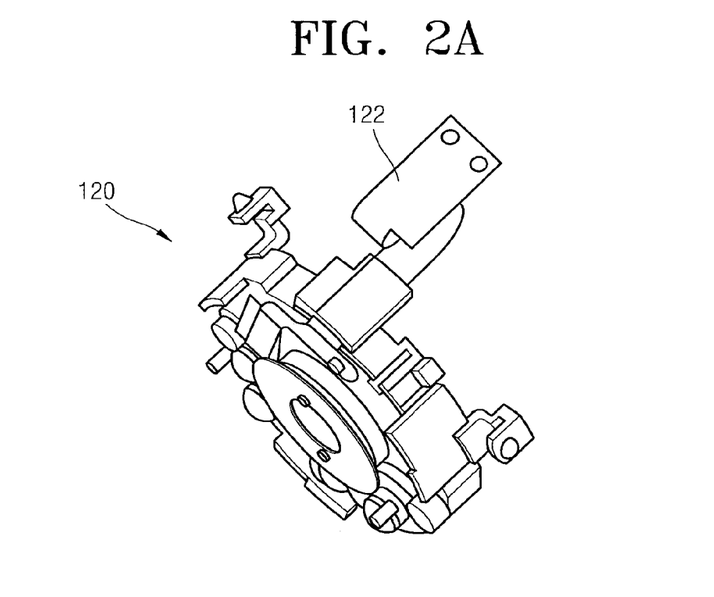
FIG. 2A is a perspective view of a shutter unit to be disposed inside a lens unit frame assembly of FIG. 1A, and a PCB coupled to the shutter unit.
Figure 2B:
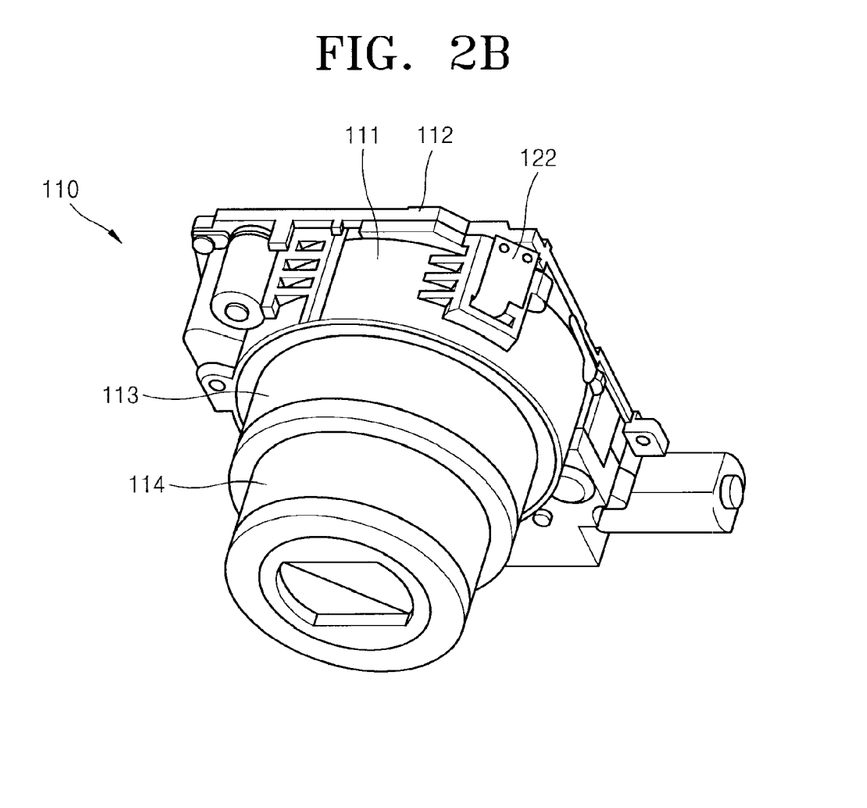
FIG. 2B is a perspective view of an assembly in which the shutter unit and the PCB of FIG. 2A are disposed inside the lens unit frame assembly of FIG. 1A.
Figure 2C:
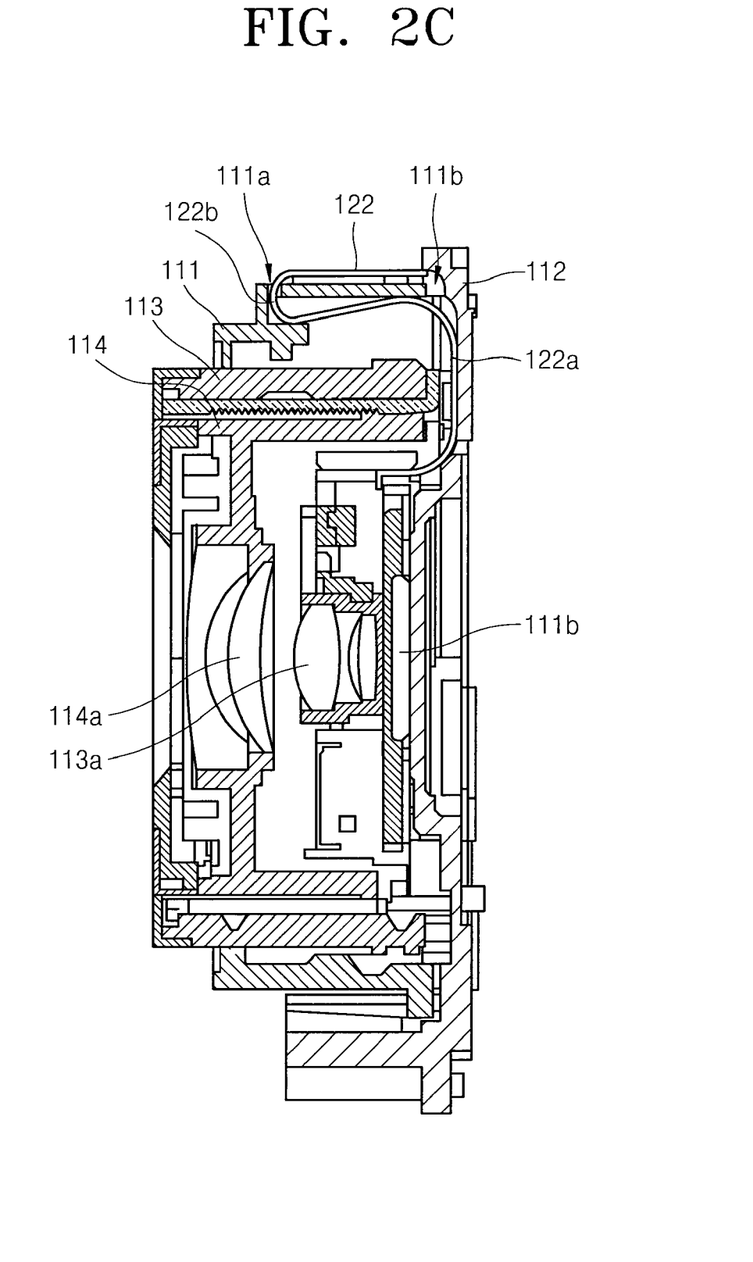
FIG. 2C is a cross-sectional view of the assembly of FIG. 2B.
Figure 2D:
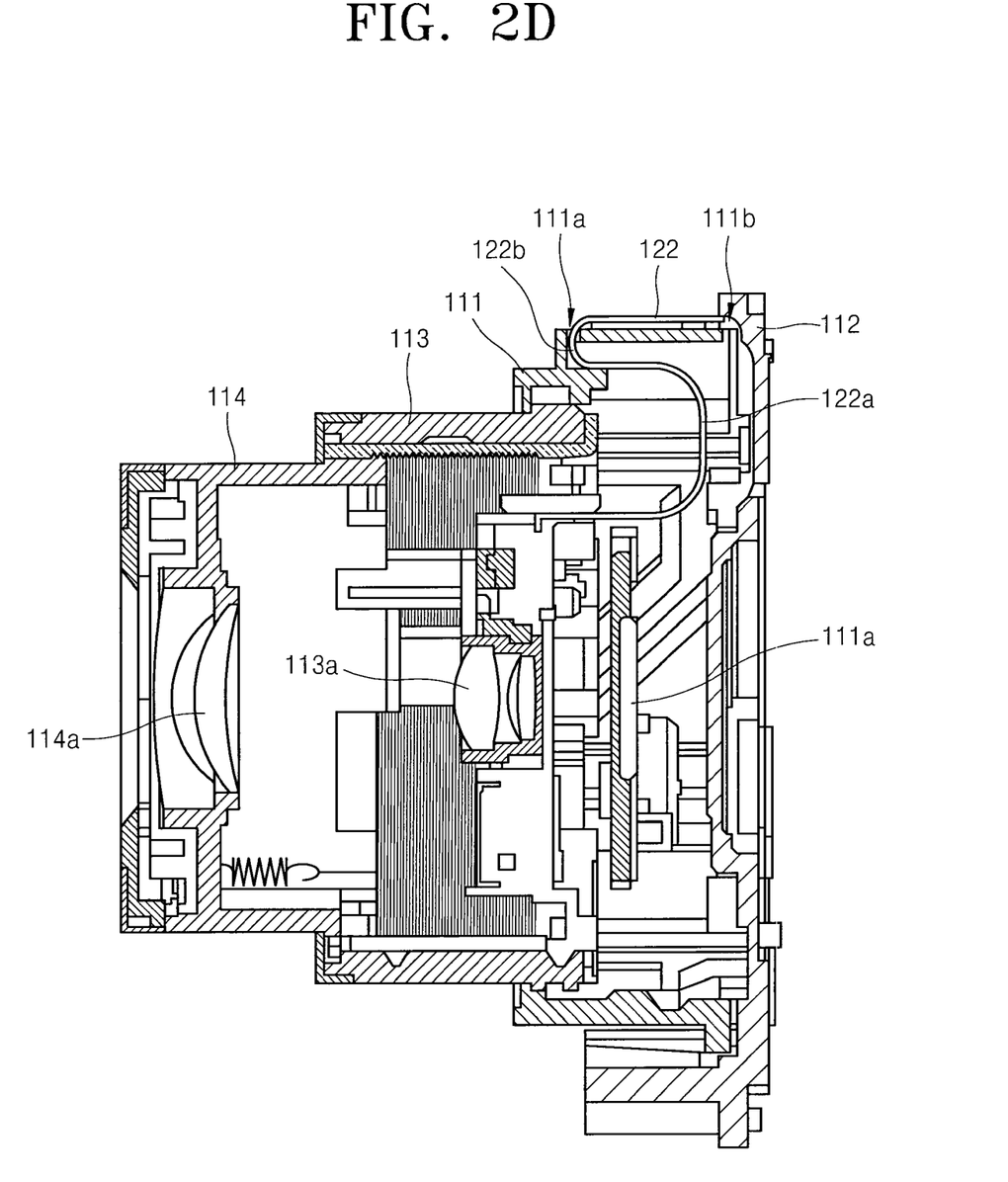
FIG. 2D is a cross-sectional view of the assembly of FIG. 2C from which a lens barrel externally protrudes.

FIG. 2A is a perspective view of a shutter unit 120 to be disposed inside a lens unit frame assembly 110 of FIG. 1A, and a PCB 122 coupled to the shutter unit 120. FIG. 2B is a perspective view of an assembly in which the shutter unit 120 and the PCB 122 of FIG. 2A are disposed inside the lens unit frame assembly 110 of FIG. 1A. FIG. 2C is a cross-sectional view of the assembly of FIG. 2B. FIG. 2D is a cross-sectional view of the assembly of FIG. 2C from which a lens barrel externally protrudes.

Referring to FIGS. 2A through 2D, the shutter unit 120 is disposed inside a lens unit frame 111. Referring to FIG. 2B, a first lens barrel 113 and a second lens barrel 114 are disposed in front of the shutter unit 120. To be more specific, FIG. 2B corresponds to a case in which the first lens barrel 113 and the second lens barrel 114 externally protrude out of the lens unit frame 111. Obviously, the first lens barrel 113 and the second lens barrel 114 may be retracted inside the lens unit frame 111 as illustrated in FIG. 2C, and may externally protrude out of the lens unit frame 111 as illustrated in FIG. 2D, according to user manipulations. A first group lens 114a is disposed in the second lens barrel 114, a second group lens 113a is disposed in the first lens barrel 113, and a third group lens 111b is disposed in the lens unit frame 111 but the present invention is not limited thereto.

The PCB 122 extends from the inside of the lens unit frame 111 to the outside of the lens unit frame 111, and is bent twice, as illustrated in the drawings. That is, the PCB 122 extends from the shutter unit 120, that is disposed inside the lens unit frame 111, toward a rear of the lens unit frame 111 so as to emerge from the inside of the lens unit frame 111 to the outside of the lens unit frame 111 through a first opening 111a such that within the unit frame 111, the PCB 122 is bent twice at two points respectively indicated by a reference numeral 122a and a reference numeral 122b. Since the PCB 122 is bent twice, although a position of the shutter unit 120 is moved in a forward direction due to the first and second lens barrels 113 and 114 protruding toward a front of the lens unit frame 111, the PCB 122 is not disconnected. Obviously, if a length of the PCB 122 has to be lengthened according to requirements, the PCB 122 may be bent more than twice.

The position of the shutter unit 120 may be changed such as by being moved toward the front of the lens unit frame 111, and thus, to avoid disconnection of the PCB 122 due to such a position change of the shutter unit 120, the PCB 122 may extend from the shutter unit 120 toward the rear of the lens unit frame 111. At this time, in order to allow the PCB 122 to easily emerge from the inside of the lens unit frame 111 to the outside of the lens unit frame 111, longitudinal axes of the first opening 111a and a second opening 111b may be formed to be perpendicular to an axis of light incident on the lens unit frame 111.

Figure 3A:
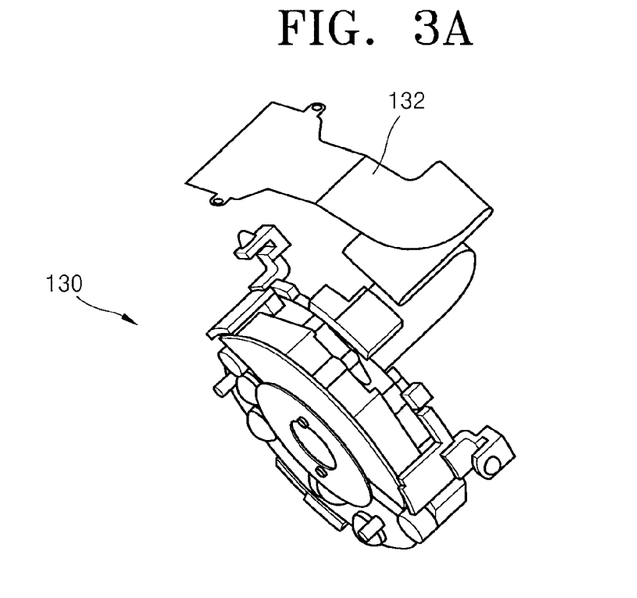
FIG. 3A is a perspective view of a shutter unit to be disposed inside a lens unit frame assembly of FIG. 1A and a PCB coupled to the shutter unit.
Figure 3B:
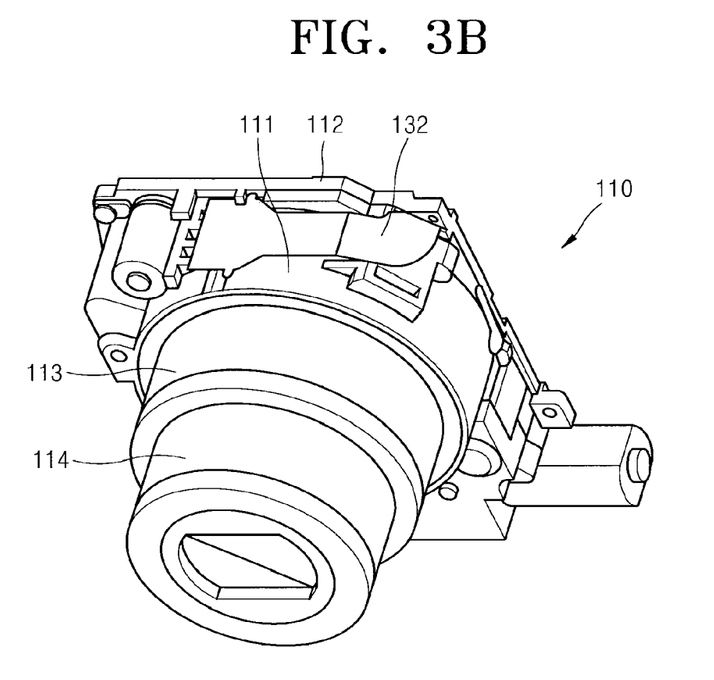
FIG. 3B is a perspective view of an assembly in which the shutter unit and the PCB of FIG. 3A are disposed inside the lens unit frame assembly of FIG. 1A.
Figure 3C:
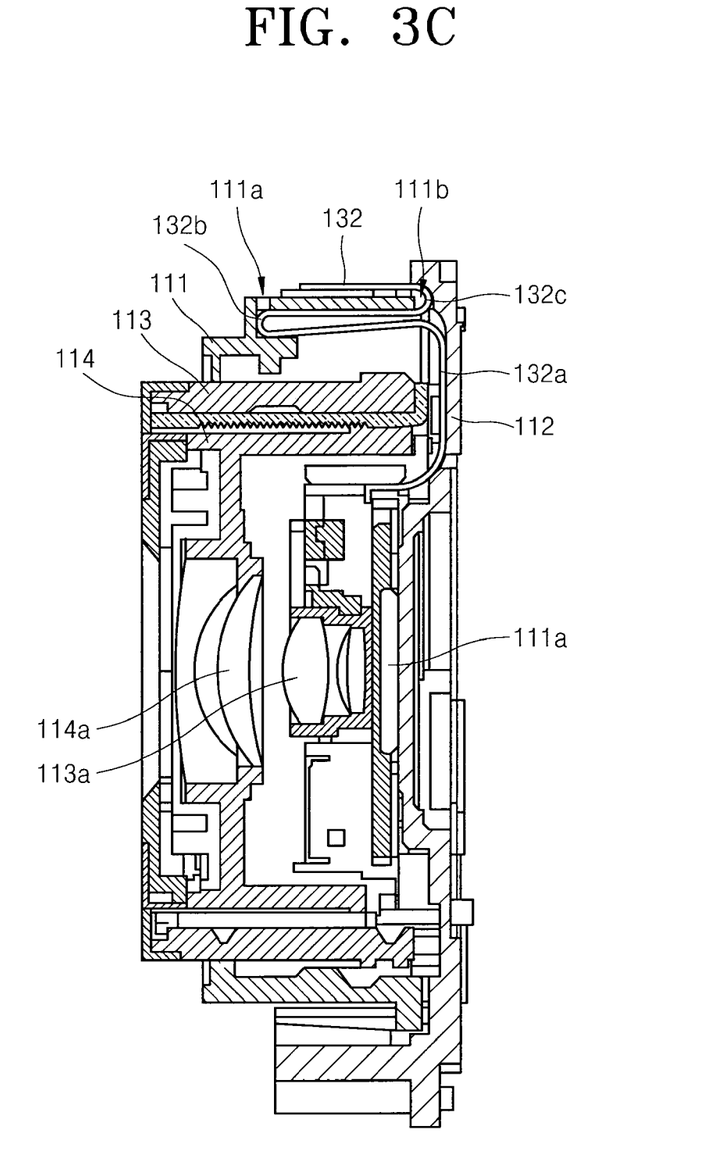
FIG. 3C is a cross-sectional view of the assembly of FIG. 3B.
Figure 3D:
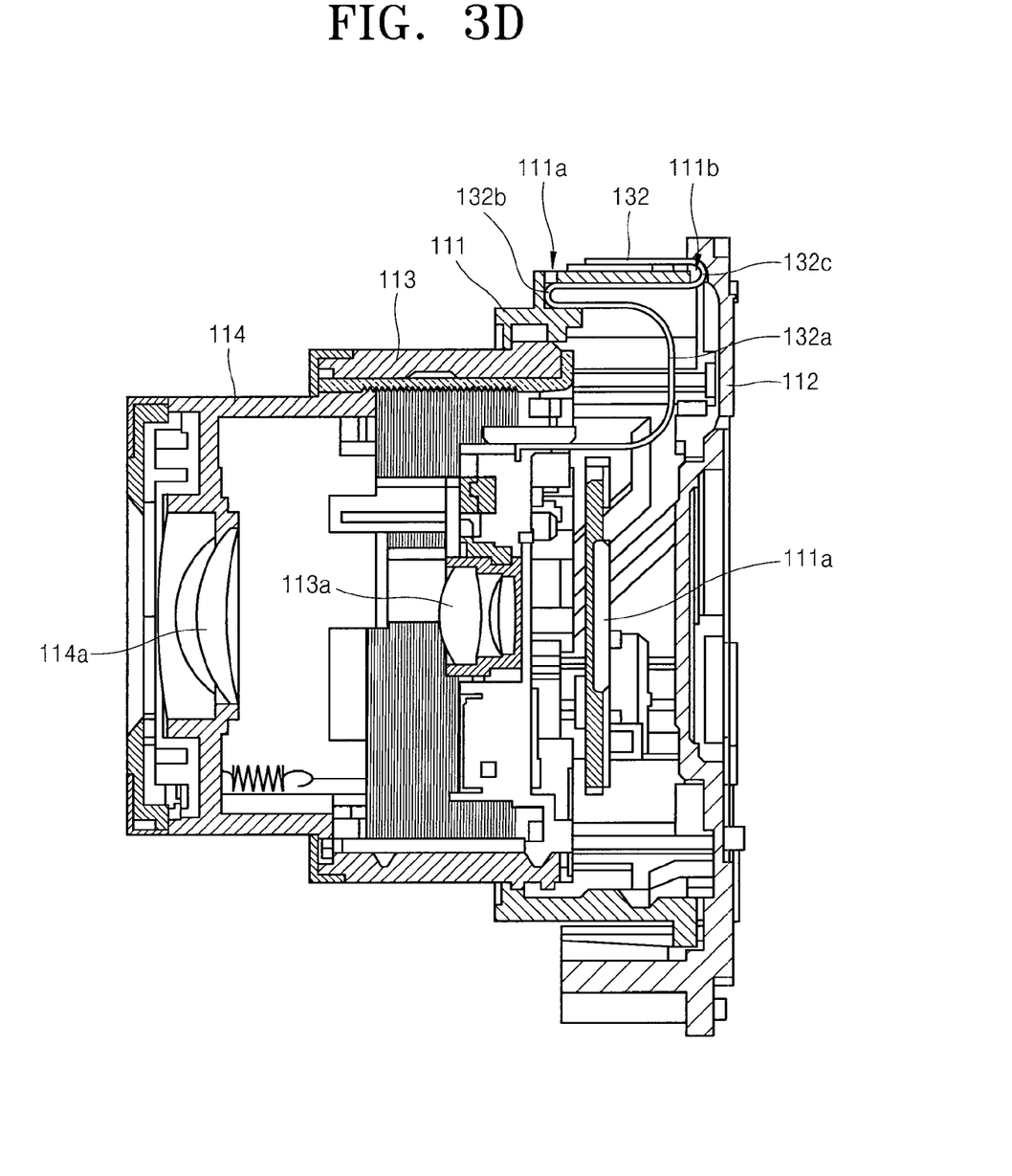
FIG. 3D is a cross-sectional view of the assembly of FIG. 3C from which a lens barrel externally protrudes.

FIG. 3A is a perspective view of a shutter unit 130 to be disposed inside a lens unit frame assembly 110 of FIG. 1A, and a PCB 132 coupled to the shutter unit 130. FIG. 3B is a perspective view of an assembly in which the shutter unit 130 and the PCB 132 of FIG. 3A are disposed inside the lens unit frame assembly 110 of FIG. 1A. FIG. 3C is a cross-sectional view of the assembly of FIG. 3B. FIG. 3D is a cross-sectional view of the assembly of FIG. 3C from which a lens barrel externally protrudes.

The shutter unit 130 of FIG. 3A is obtained by integrating another component to a shutter unit 120 of FIG. 2A. For example, the shutter unit 130 of FIG. 3A may be a shutter unit in which a hand-shaking compensation module is integrated. In this case, the PCB 132 extending from the shutter unit 130 further includes additional wiring and/or a chip due to the presence of the integrated hand-shaking compensation module, unlike in a PCB 122 extending from the shutter unit 120 of FIG. 2A. Thus, a length of the PCB 132 becomes longer than that of the PCB 122 of FIG. 2A. Accordingly, as illustrated in FIGS. 3C and 3D, the PCB 132 emerges from the inside of a lens unit frame 111 to the outside of a lens unit frame 111 through a second opening 111b, instead of through a first opening 111a. At this time, the PCB 132 is bent at three points respectively corresponding to reference numerals 132a, 132b, and 132c. Since the PCB 132 is bent three times, although a position of the shutter unit 130 is moved in a forward direction due to the first and second lens barrels 113 and 114 protruding toward a front of the lens unit frame 111, the PCB 132 is not disconnected. Obviously, if the length of the PCB 132 has to be lengthened according to requirements, the PCB 132 may be bent more than three times.

The position of the shutter unit 130 may be changed by being moved toward the front of the lens unit frame 111, and thus, to avoid disconnection of the PCB 132 due to such a position change of the shutter unit 130, the PCB 132 may extend from the shutter unit 130 toward the rear of the lens unit frame 111. At this time, in order to allow the PCB 132 to easily emerge from the inside of the lens unit frame 111 to the outside of the lens unit frame 111, longitudinal axes of the first opening 111a and the second opening 111b may be formed to be perpendicular to an axis of light incident on the lens unit frame 111.

Figure 3E:
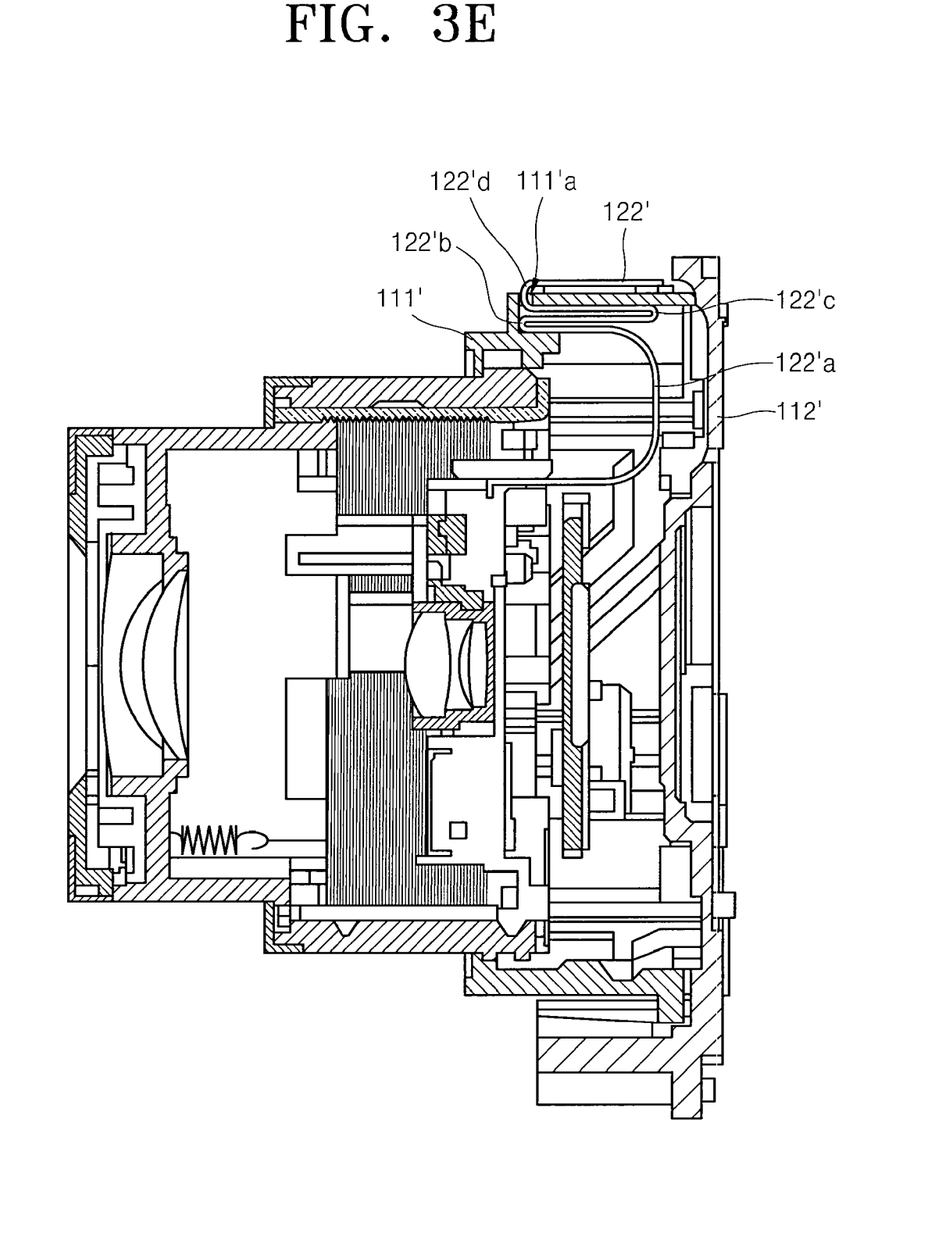
FIG. 3E is a cross-sectional view of a portion of a digital photographing apparatus shown as a comparative example.

As illustrated in FIGS. 3C and 3D, in the case where the length of the PCB 132 is increased, as illustrated in FIG. 3E that is a cross-sectional view of a portion of a digital photographing apparatus shown as a comparative example, a PCB 122' may be lengthened by a relative large amount in order to use a lens unit frame 111' having an opening 111'a at a position similar to that of a first opening 111a illustrated in FIG. 2D and not having a second opening. In this case, the PCB 122' may be bent at four points respectively corresponding to reference numerals 122'a, 122'b, 122'c, and 122'd, and then may emerge to the outside of the lens unit frame 111'. Obviously, in the case where a PCB having a short length is used, the PCB may be bent twice and then may emerge to the outside of the lens unit frame 111', similar to the case of FIG. 2D.

However, if a length of the PCB 122' is longer than that of a PCB 122 of FIG. 2D and is equal to that of the PCB 132 of FIG. 3D, the PCB 122' may not be mounted on a lens unit frame the same as that of FIG. 3E. That is, when the lens unit frame 111' of FIG. 3E is used, a PCB such as the PCB 122' of FIG. 3E having a length longer than that of FIG. 2D has to be used to make the PCB that is bent four times and to emerge to the outside of the lens unit frame 111'. Thus, even though the PCB 132 having a length as illustrated in FIG. 3D may be sufficiently used considering wiring and/or a chip to be disposed on a PCB, the PCB 122' having a relatively longer length as illustrated in FIG. 3E has to be used, and thus an unnecessary waste of materials occurs.

However, since the digital photographing apparatus according to the current embodiment has the first opening 111a and the second opening 111b arranged in the lens unit frame 111, it is possible to select and use an appropriate opening according to a length of a PCB. Accordingly, with respect to various products, the lens unit frame 111 having a constant shape may be mass manufactured, while a PCB having an optimized length for each of the various products may be used without unnecessarily increasing or reducing a length of the PCB.

Figure 4:
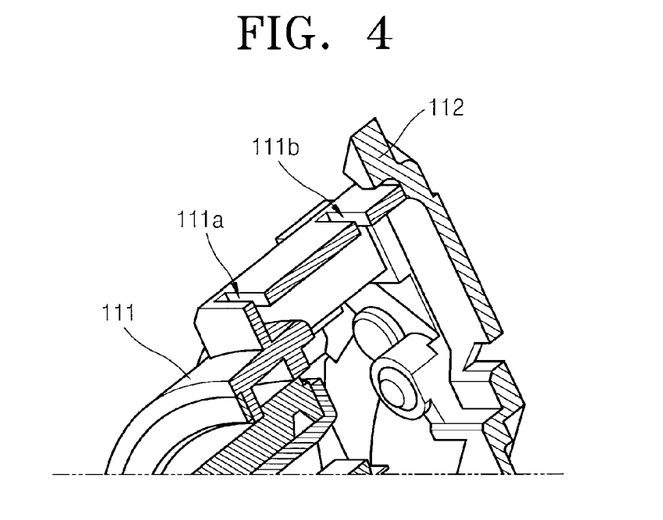
FIG. 4 is a cross-sectional perspective view of a portion of a digital photographing apparatus according to another embodiment of the present invention.

FIG. 4 is a cross-sectional perspective view of a portion of a digital photographing apparatus according to another embodiment of the present invention.

In a digital photographing apparatus according to the embodiment illustrated in FIG. 1B, a lens unit frame 111 has a first opening 111a through which a PCB may emerge from the inside of the lens unit frame 111 to the outside of the lens unit frame 111. Also, the lens unit frame 111 and a lens unit base 112 are disposed to form a gap therebetween, thereby forming a second opening 111b corresponding to the gap through which a PCB may emerge from the inside of the lens unit frame 111 to the outside of the lens unit frame 111. However, in the digital photographing apparatus according to the current embodiment, a lens unit frame 111 and a lens unit base 112 are not disposed to form a gap therebetween so as to form a second opening 111b corresponding to the gap, but as illustrated in FIG. 4, the lens unit frame 111 includes all of a first opening 111a and the second opening 111b so that a PCB may emerge from the inside of the lens unit frame 111 to the outside of the lens unit frame 111 through one of the first opening 111a and the second opening 111b. In this manner, the embodiments of the present invention may vary.

Figure 5:
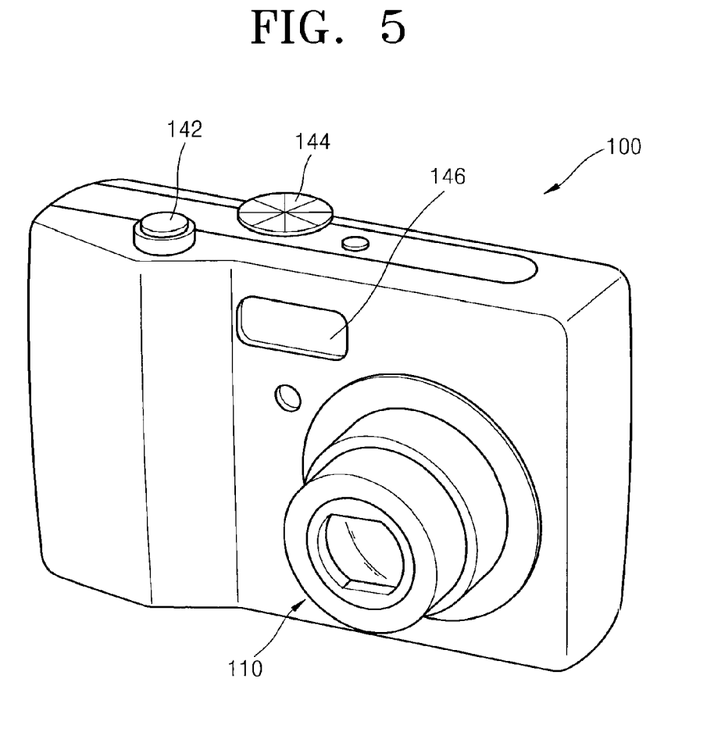
FIG. 5 is a perspective view of a digital photographing apparatus according to an embodiment of the present invention.

FIG. 5 is a perspective view of a digital photographing apparatus 100 according to another embodiment of the present invention. As illustrated in FIG. 5, the digital photographing apparatus 100 includes a lens unit frame assembly 110, a shutter button 142, a mode dial 144, and/or a flash unit 146. A portion of the lens unit frame assembly 110 is disposed inside a case of the digital photographing apparatus 100, and thus the portion is not illustrated in FIG. 5. However, the lens unit frame assembly 110 may have a first opening 111a and a second opening 111b as described above, so that a PCB possibly having various lengths may emerge from the inside of a lens unit frame to the outside of the lens unit frame, with an appropriate length that is not unnecessarily increased or reduced.

As described above, according to the embodiments of the present invention, it is possible to embody a low-priced digital photographing apparatus that can be mass manufactured by integrating components and lessening required materials during mass manufacturing.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A digital photographing apparatus comprising:
   a lens unit frame having an opening through which light enters from a forward direction, and having a lens unit to be disposed inside the lens unit frame, or having a lens barrel comprising a lens unit to be disposed inside the lens unit frame; and
   a lens unit base disposed at a rear of the lens unit frame so as to be coupled to the lens unit frame;
   wherein:
   the lens unit frame comprises a first opening;
   the lens unit frame and the lens unit base are disposed to form a gap between the lens unit frame and the lens unit base, thereby forming a second opening corresponding to the gap;
   the first opening and the second opening are located at a same angle about a central axis of the lens barrel, each of the first opening and the second opening extending entirely between respective beginning and ending walls, each beginning and ending wall spaced radially from each other about the central axis, and no portion of the first opening and the second opening are on opposite sides of the lens barrel from each other; and
   a printed circuit board (PCB) emerges from the inside of the lens unit frame to the outside of the lens unit frame through the first opening or the second opening wherein if the PCB is a first length it emerges through the first opening and if the PCB is a second length different than the first length it emerges through the second opening.

2. The digital photographing apparatus of claim 1, wherein the first opening and the second opening are formed to be parallel to each other.

3. The digital photographing apparatus of claim 1, wherein longitudinal axes of the first opening and the second opening are formed to be perpendicular to an axis of light incident on the lens unit frame.

4. The digital photographing apparatus of claim 3, wherein the first opening is disposed in a more forward direction than the second opening.

5. The digital photographing apparatus of claim 4, further comprising:
   a PCB emerging from the inside of the lens unit frame to the outside of the lens unit frame through the first opening, wherein the PCB is bent at least twice.

6. The digital photographing apparatus of claim 5, wherein the PCB extends from a shutter unit that is disposed inside the lens unit frame, toward a rear of the lens unit frame so as to emerge from the inside of the lens unit frame to the outside of the lens unit frame through the first opening such that within the lens unit frame, the PCB is bent at least twice.

7. The digital photographing apparatus of claim 4, further comprising:
   a PCB emerging from the inside of the lens unit frame to the outside of the lens unit frame through the second opening, wherein the PCB is bent at least three times.

8. The digital photographing apparatus of claim 7, wherein the PCB extends from a shutter unit, that is disposed inside the lens unit frame, toward a rear of the lens unit frame so as to emerge from the inside of the lens unit frame to the outside of the lens unit frame through the second opening such that within the lens unit frame, the PCB is bent at least three times.

9. The digital photographing apparatus of claim 8, wherein the shutter unit comprises a hand-shaking compensation module.

10. A digital photographing apparatus comprising:
    a lens unit frame having an opening through which light enters from a forward direction, and having a lens unit to be disposed inside the lens unit frame, or having a lens barrel comprising a lens unit possibly to be disposed inside the lens unit frame,
    wherein;
    the lens unit frame comprises:

a first opening through which a PCB emerges from the inside of the lens unit frame to the outside of the lens unit frame, and a second opening through which a PCB emerges from the inside of the lens unit frame to the outside of the lens unit frame, the first opening and the second opening being located at a same angle about a central axis of the lens barrel each of the first opening and the second opening extending entirely between respective beginning and ending walls, each beginning and ending wall spaced radially from each other about the central axis, and no portion of the first opening and the second opening are on opposite sides of the lens barrel from each other.

11. The digital photographing apparatus of claim 10, wherein the first opening and the second opening are formed to be parallel to each other.

12. The digital photographing apparatus of claim 10, wherein longitudinal axes of the first opening and the second opening are formed to be perpendicular to an axis of light incident on the lens unit frame.

13. The digital photographing apparatus of claim 12, wherein the first opening is disposed in a more forward direction than the second opening.

14. The digital photographing apparatus of claim 13, further comprising: a PCB emerging from the inside of the lens unit frame to the outside of the lens unit frame through the first opening, wherein the PCB emerges from the inside of the lens unit frame to the outside of the lens unit frame through the first opening, wherein the PCB is bent at least twice.

15. The digital photographing apparatus of claim 14, wherein the PCB emerging from the inside of the lens unit frame to the outside of the lens unit frame through the first opening extends from a shutter unit that is disposed inside the lens unit frame, toward a rear of the lens unit frame so as to emerge from the inside of the lens unit frame to the outside of the lens unit frame through the first opening such that within the lens unit frame, the PCB emerging from the inside of the lens unit frame to the outside of the lens unit frame through the first opening is bent at least twice.

16. The digital photographing apparatus of claim 13, further comprising:

a PCB emerging from the inside of the lens unit frame to the outside of the lens unit frame through the second opening, wherein the PCB emerging from the inside of the lens unit frame to the outside of the lens unit frame through the second opening is bent at least three times.

17. The digital photographing apparatus of claim 16, wherein the PCB emerging from the inside of the lens unit frame to the outside of the lens unit frame through the second opening extends from a shutter unit that is disposed inside the lens unit frame, toward a rear of the lens unit frame so as to emerge from the inside of the lens unit frame to the outside of the lens unit frame through the second opening such that within the lens unit frame, the PCB emerging from the inside of the lens unit frame to the outside of the lens unit frame through the second opening is bent at least three times.

18. The digital photographing apparatus of claim 17, wherein the shutter unit comprises a hand-shaking compensation module.

* * * * *